Nov. 10, 1925.
O. DUDA
1,561,418

TOOL FOR STRAIGHTENING TUBES

Filed Jan. 26, 1924

INVENTOR.
Oswald Duda
BY
ATTORNEYS.

Patented Nov. 10, 1925.

1,561,418

UNITED STATES PATENT OFFICE.

OSWALD DUDA, OF HOUSTON, TEXAS, ASSIGNOR TO REED ROLLER BIT COMPANY, OF HOUSTON, TEXAS, A CORPORATION OF TEXAS.

TOOL FOR STRAIGHTENING TUBES.

Application filed January 26, 1924. Serial No. 688,829.

*To all whom it may concern:*

Be it known that I, OSWALD DUDA, a citizen of the United States, and resident of Houston, in the county of Harris and State of Texas, have invented certain new and useful Improvements in Tools for Straightening Tubes, of which the following is a specification.

The object of the invention is to provide a tool for straightening out the casing of a deep well, which has become damaged or is in a collapsed condition by reason of the pressure exerted thereon. In providing this tool I have sought to present a simple and rugged construction in which no bearing pins are employed for the smoothing out rollers which would be subjected to strain and breakage.

In my improved construction the smoothing out rollers are combined with a backing or mandrel member which takes the strain, and renders the apparatus reliable and durable in action.

Figures 1, 2, 3:
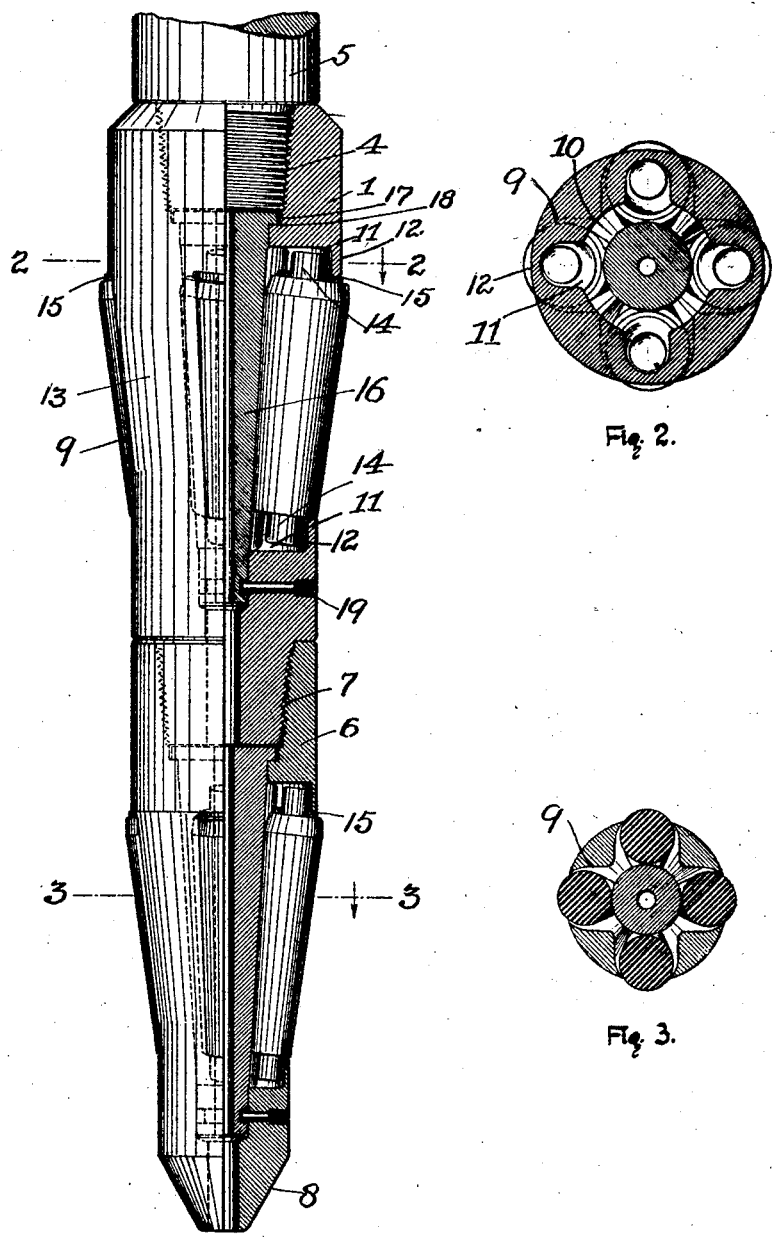
Figure 1 is a view partly in section and partly in elevation.
Fig. 2 is a sectional view on line 2—2 of Fig. 1.
Fig. 3 is a sectional view on line 3—3 of Fig. 1.

In these drawings 1 indicates the main body of the upper section of the tool. This is provided with a threaded socket 4 for attachment to the rod or pipe 5 by which the tool is inserted to place within the casing and turned to rotate the tool.

The tool may be made up of a plurality of sections. In the example illustrated I show two sections, the body of the lower one being marked 6, this being connected to the upper section by a screw threaded stem and socket at 7. This section is of smaller diameter than the upper section and it terminates in a conical lower end at 8. The upper section has a plurality of recesses or pockets 9 opening out through the outer face or wall of the tool and communicating at their inner sides or portions with a central bore 10. These slots or pockets 9 communicate at their upper and lower ends with recesses or cavities 11 defined by outer wall portions 12. These cavities or recesses also open into the interior bore of the body.

In the slots or pockets 9 conical rollers are inserted from the interior bore outwardly and the peripheries of these rollers project out beyond the periphery of the body 1. This body at the zone where the conical rollers are located is tapered as shown at 13. The rollers are not only of frustro-conical form, but their axes are inclined downwardly and inwardly. The rolls have small diameter projections 14 lying in the recesses 11, washers 15 being located in the upper projections to take the upward thrust of the conical rolls. After the rolls are inserted in place by introducing them through the central bore and into the slots or pockets, a backing member or mandrel 16 is dropped into the bore of the body of the tool. This mandrel is tapered downwardly to conform to the contiguous bearing faces of the rolls and it affords a backing member to receive the thrust of the rolls when in action within the casing. This mandrel or backing member is held in place by its upper end flanged at 17 resting on the shoulder 18 formed within the body, the screw threaded stem of the rod or pipe 5 bearing on the upper end of said member or closely overlying it. At its lower end the backing member has a circumferential groove in which a pin 19, seated in the body, engages as additional fastening means, more especially to prevent the mandrel from dropping out during transportation. The slots or recesses 9 are narrower at their outer mouths than they are towards the interior of the body and this construction together with the projections 14 serve to retain the rollers in place. The sustaining bearing, however, is derived from the contact of the tapered rolls with the central backing or bearing member 16. The rollers turn on the mandrel and as the rollers are arranged around this mandrel in pairs and with members of the pairs at substantially diametrically opposite points the thrust of the roller is transmitted through the mandrel and is sustained by the oppositely positioned smoothing or straightening roll, so that little or no strain is exerted upon the pins 14, or upon the walls of the recesses.

The lower section of the tool is constructed with rolls and mandrel as above described, with the main exception that the parts are of smaller diameter throughout.

The mandrel or backing member is hollow for the passage of a circulating fluid.

I claim:

1. In combination in a tool for straightening tubes, a body having a screw threaded socket at its upper end, a member screwed into said socket for imparting rotary movement to the body, pockets in the body, rollers in said pockets exposed therethrough to bear on the tube to be straightened, a mandrel within the body on which the rollers bear, means for holding the mandrel against lengthwise movement relative to the body, said mandrel, body and member having aligned passage ways for flushing fluid at the axial center of the tool, said passage ways delivering the said flushing fluid at the lower end of the body, substantially as described.

2. In combination in a tool for straightening tubes, a body having at its upper end a screw threaded socket, a member screw threaded into said socket for turning the body, said body having pockets opening out through its side wall, rollers in said pockets having their peripheries exposed to contact with the tube to be straightened, said rolls being of tapered form and arranged in inclined position, a tapered mandrel arranged coaxially with the body, and upon which the rolls bear, said mandrel having a flange resting on the bottom of the socket, the screw threaded member which fits in the socket overlying the flanged end of the said mandrel, substantially as described.

In testimony whereof I affix my signature.

OSWALD DUDA.